March 11, 1958 M. KLEBANOFF ET AL 2,826,630

HERMETIC CRYSTAL HOLDER

Filed July 25, 1952

Michael Klebanoff
Mannes N. Glickman
INVENTORS

BY Philip S. Hilbert
ATTORNEY

United States Patent Office 2,826,630
Patented Mar. 11, 1958

2,826,630

HERMETIC CRYSTAL HOLDER

Michael Klebanoff, West Orange, and Mannes N. Glickman, Nutley, N. J.

Application July 25, 1952, Serial No. 300,896
3 Claims. (Cl. 174—50.58)

This invention relates to hermetically sealed crystal holders.

Piezoelectric crystal units are conventionally sealed in a metal casing open at one end and provided with a hermetic seal at the open end, such seal including a metal member, a vitreous member and a pair of spaced metal terminals extending through the vitreous member for mounting the crystal on one side of the vitreous member and providing plug in means on the other side of the vitreous member. In addition to obtaining a true hermetic seal of the crystal mounted within the holder, it is extremely important that any contamination of the crystal be avoided during the sealing operation. Such sealing operation involves the use of solder and flux to adhere the metal member of the seal to the casing. Such solders and fluxes, as well as the tinned metal coating on the metal parts being soldered, are a source of volatile matter, which if allowed to enter the interior of the holder, will contaminate the crystal. This is particularly true of the exceedingly sensitive crystals used in ultra high frequency circuits.

Accordingly, an object of this invention, is to provide an improved sealed crystal holder wherein engaging portions of the holder casing and the metal rim member of the seal are so related as to form an unusually tight frictional seal therebetween, together with a solder seal associated with the frictional seal in a manner to prevent any possible crystal contaminants from penetrating the frictonal seal.

Another object of this invention is to provide in a hermetically sealed crystal holder of the character described, an open end casing having an offset portion at the open end to form a seat for a seal which includes a metal rim member having an angular peripheral edge, the upper portion of the casing wall above the rim member being bent inwardly about the angular edge of the rim member so as to provide a very tight, frictional seal between the angular edge of the rim member and the bent portion of the casing wall.

A further object of this invention is to provide in a crystal holder of the character described, an open end casing having a seal at the open end thereof, such seal including a vitreous disc and a metal rim member of right angle cross section sealed to the disc, a marginal wall portion at the open end of the casing being bent inwardly about the apex of the rim member to form an angle of less than 90°, the angularly related portions of the rim member and the casing wall being adapted to receive therebetween a solder seal, the frictional seal formed between the rim member and the bent casing wall being adapted to prevent foreign material derived from and incident to the soldering operation from entering the interior of the holder and contaminating the crystal mounted therein.

Still another object of this invention is to provide in a crystal holder of the character described, a casing open at one end, a seal for the casing including a thin vitreous disc and a metal rim with a portion embedded and sealed in a surface of the disc, a marginal portion of the casing wall projecting above the rim, the rim being crimped toward and in angularly spaced relation to the rim portion whereby to avoid injury to the vitreous disc yet providing a peripheral space for a substantial solder seal.

Other objects of this invention will in part be obvious and in part hereinafter pointed out.

The invention accordingly consists in the combinations of elements and arrangement of parts, which will be exemplified in the embodiments hereinafter described and of which the scope of invention will be indicated in the claims following.

In the accompanying drawing.

Figure 1:
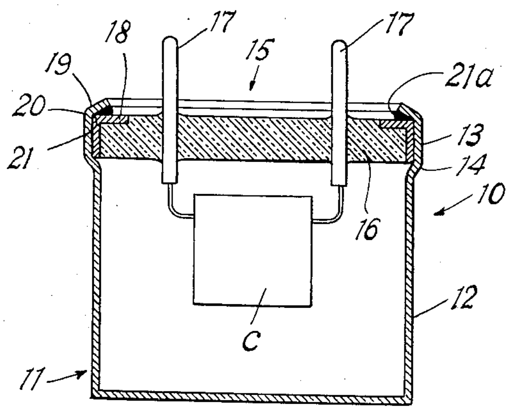
Fig. 1 is a longitudinal sectional view of a hermetic crystal holder embodying the invention.
Figure 2:
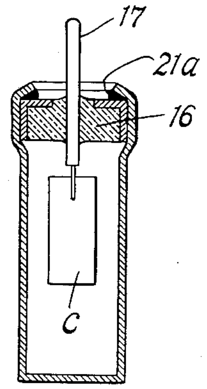
Fig. 2 is a transverse sectional view thereof.

Referring in detail to the drawing and particularly to Fig. 1, 10 designates a hermetically sealed crystal holder embodying the invention. The same comprises a stamped metal hollow casing 11 which is closed at one end and open at the other end. The side walls 12 of the casing at their upper end, are offset outwardly as at 13, to form a peripheral seat 14.

A seal 15 is provided for the open end of casing 11, such seal having mounted on one side thereof, a piezoelectric crystal C. The seal 15 comprises a thin, flat disklike member of vitreous material 16, through which extend a pair of spaced metal terminal members 17, which are sealed thereto in a manner known in the art. A metal rim member 18 is sealed to the periphery of disc 16, such rim member being of right angle cross section with the horizontal leg portions thereof being embedded in the top surface of the disc while the vertical leg portions thereof extend about the edge of the disc.

The metal rim member 18 and the terminal members 17 may be formed of metal alloys well known in the glass-metal sealing art, such alloys having a coefficient of expansion substantially the same as that of the vitreous disc 16. The casing 11 may be formed of any suitable metal or alloy, such as brass, nickel silver or the like. The rim member is tinned or otherwise treated to facilitate soldering operations as hereinafter described.

The crystal C is suitably mounted on the inner ends of the terminal members 17, and tested, in a manner well known in the art. The seal 15 is then located in the open end of the casing 11, disposing the crystal within the interior of the casing, the rim member 18 engaging the seat 14. The casing wall portion 13 includes an upper marginal portion 19 which projects above the seated rim member.

The marginal casing wall portion 19 is adapted to be crimped or bent inwardly toward the horizontal leg portion of the rim member 18, by the use of suitable bending fixtures or the like. Wall portion 19 is bent in a manner to form an angle as at 20 which tightly engages the apex 21 of rim member 18 to form an exceedingly tight, frictional seal along the periphery of the contacting angular portions. The angular relationship between wall portion 19 and the horizontal leg portion of the rim member must be less than 90° and may be between about 30° and 75°. It has been found that not only is the frictional seal so produced, one of practically hermetic properties, but additionally, the bending action leaves the vitreous disc 16 free of undue transmitted stresses and strains which might injure the same.

The seal is completed by a soldering operation wherein solder in the form of a wire **21*a* may be located between the bent wall portion 19** and the rim member, which is raised to suitable soldering temperature by means known in the art. It is understood that solder in other forms and involving other known soldering techniques may also be used to achieve the final seal. It is apparent that any foreign material in vapor or other form which may be given off from the flux, solder or tinning on the rim member, during the soldering operation, cannot penetrate the exceedingly tight seal between the casing and rim member, thus preventing the entry of such foreign material into the interior of the casing and avoiding any possible contamination of the sensitive crystal C. It will also be apparent that a substantial amount of solder may be introduced between the angularly related parts and thereby increase the strength of the solder seal.

Figure 3:
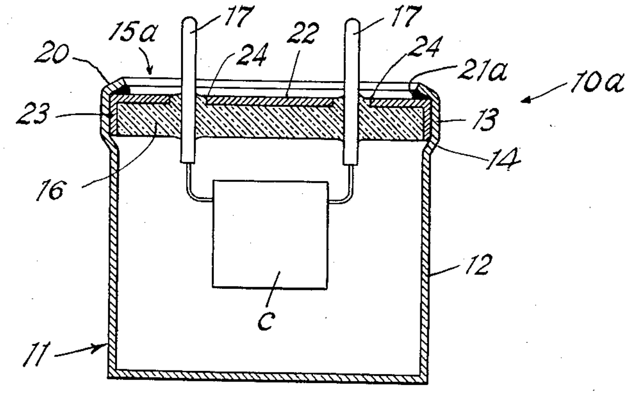
Fig. 3 is a longitudinal sectional view of a modification of the device embodying the invention.

As shown in Fig. 3, the invention is applicable to a hermetically sealed crystal holder 10*a*, which is similar to device 10, except that the seal 15*a* is made up of vitreous disc 16 and a flat metal wall 22 having its bottom face sealed to the top face of the disc, the wall having a downwardly extending peripheral flange 23 which is sealed to the edge of the disc. The wall 22 is formed with openings 24 through which extend the terminal members 17, the same being in spaced relation to the edges of the openings. The seal 15*a* is seated in the casing 11 with the crystal C located within the casing and the casing wall portion 19 is bent inwardly and the solder seal applied, in the manner previously described.

It is understood that the metal wall 22 is made of an alloy similar to that from which terminal members 17 are formed, and has a thermal expansion coefficient substantially equal to that of the disc 16.

With either embodiment of the invention, the crystal C located within the metal casing, which may be evacuated in a manner known in the art, will be proof against contamination in practically any form. Contaminants which may be derived from soldering flux or the like, cannot enter the interior of the holder due to the tight frictional seal between the rim and the casing. Other contaminants which may be derived from the tinned surfaces of the metal rim members, at soldering temperature, are confined to the exterior of the casing and the highly sensitive crystal C is free of possible contamination.

The outer ends of the terminal members 17 provide plugging means for connecting the crystal in an external circuit, such as an ultra high frequency circuit or the like.

As various possible embodiments might be made of the described invention, and as various changes might be made in the embodiments set forth, it is understood that all matter herein set forth or shown is to be interpreted as illustrative and not in a limiting sense.

Having thus described our invention, we claim as new and desire to protect by Letters Patent:

1. A hermetically sealed crystal holder comprising a casing open at one end thereof and a seal for the open end of said casing comprising an endless metal rim member, a vitreous disc within said member and sealed thereto, and a pair of spaced terminals passing through said disc and sealed thereto, said rim member comprising angularly related leg portions, said casing at the open end thereof comprising a lower peripheral wall portion in contact with one leg portion of said rim member and an upper peripheral wall portion extending above said rim member and bent inwardly toward the other leg portion of said rim member to provide a peripheral angular portion tightly engaging the peripheral apex portion of said rim member, and a continuous solder seal between said bent wall portion and said other leg portion of said rim member.

2. A hermetically sealed crystal holder comprising a casing open at one end thereof, and a seal for the open end of said casing comprising a metal rim member having a peripheral angular edge, a thin flat vitreous body within said rim member and sealed thereto, and a pair of spaced terminals passing through said body and sealed thereto, one peripheral portion of said rim member engaging the inner surface of said casing below the open end thereof, means on said casing for seating said rim member with the upper edge thereof spaced below the upper edge of said casing, a peripheral portion of said casing at the open end thereof and above said rim member being bent inwardly to form a peripheral angular portion conforming to and tightly engaging the angular edge of said rim member, and a continuous solder seal between the bent portion of said casing and said rim member.

3. A hermetically sealed device comprising a casing open at one end thereof, a seal for the open end of the casing comprising a vitreous insulator and a metal rim extending about the edge of said insulator and having a peripheral angular upper edge, said casing being formed with a peripheral shoulder spaced inwardly of the open end thereof for seating the lower edge of said rim, the marginal portion of said casing at the open end thereof being bent inwardly about the angular edge of said rim to press said rim against said casing shoulder and to form a tight contact seal between the apex of said rim and the bent marginal portion of said casing throughout the peripheral extent thereof, and a continuous peripheral solder seal filling the space between the bent casing portion and the rim portion opposed thereto.

References Cited in the file of this patent

UNITED STATES PATENTS

| | | |
|---|---|---|
| 2,416,067 | Robb et al. | Feb. 18, 1947 |
| 2,445,719 | Sylvester | July 20, 1948 |
| 2,454,244 | Wintermute | Nov. 16, 1948 |
| 2,459,193 | Sparks | Jan. 18, 1949 |
| 2,503,429 | Ziegler | Apr. 11, 1950 |
| 2,514,976 | Stivin | July 11, 1950 |
| 2,577,576 | Glickman et al. | Dec. 4, 1951 |
| 2,627,538 | Brennan | Feb. 3, 1953 |